US011539120B2

(12) United States Patent
Pelletti

(10) Patent No.: US 11,539,120 B2
(45) Date of Patent: Dec. 27, 2022

(54) RANGE ADAPTABLE ANTENNA SYSTEM FOR AUTONOMOUS VEHICLES

(71) Applicant: Metawave Corporation, Palo Alto, CA (US)

(72) Inventor: Chiara Pelletti, San Francisco, CA (US)

(73) Assignee: METAWAVE Corporation, Carlsbad, CA (US)

( * ) Notice: Subject to any disclaimer, the term of this patent is extended or adjusted under 35 U.S.C. 154(b) by 517 days.

(21) Appl. No.: 16/667,784

(22) Filed: Oct. 29, 2019

(65) Prior Publication Data
US 2020/0136240 A1 Apr. 30, 2020

Related U.S. Application Data

(60) Provisional application No. 62/752,258, filed on Oct. 29, 2018.

(51) Int. Cl.
*H01Q 1/32* (2006.01)
*G05D 1/02* (2020.01)
*H04W 4/40* (2018.01)
*H01Q 3/26* (2006.01)
*G05D 1/00* (2006.01)

(52) U.S. Cl.
CPC ......... *H01Q 1/3233* (2013.01); *G05D 1/0022* (2013.01); *G05D 1/028* (2013.01); *G05D 1/0257* (2013.01); *H01Q 3/2605* (2013.01); *H04W 4/40* (2018.02)

(58) Field of Classification Search
CPC ...... H01Q 1/3233; H01Q 3/2605; H04W 4/40

USPC .................................. 342/70, 372, 417, 465
See application file for complete search history.

(56) References Cited

U.S. PATENT DOCUMENTS 6,222,503 B1   4/2001  Gietema et al.
6,492,949 B1   12/2002 Breglia et al.
(Continued)

OTHER PUBLICATIONS

T. Fujimoto et al. "Design of Antenna System for Radio Wave Type Laparoscope" Graduate School of Engineering, Nagasaki Unviversity, pp. 1-2.

(Continued)

*Primary Examiner* — Bo Fan
(74) *Attorney, Agent, or Firm* — Sandra Lynn Godsey

(57) ABSTRACT

Examples disclosed herein relate to a range adaptable antenna system for use in autonomous vehicles. The antenna system has a connector and a transition layer to receive an RF transmission signal from a transmission signal controller, a range adaptable power divider layer coupled to the connector and transition layer to divide the RF transmission signal into a plurality of transmission signals to propagate through an array of transmission lines, with a set of transmission lines from the array of transmission lines having a set of switches, an RFIC layer having a plurality of phase shifters to apply different phase shifts to the plurality of transmission signals and generate a plurality of phase shifted transmission signals, and an antenna layer having an array of superelements for radiating the plurality of phase shifted transmission signals, wherein a set of superelements is connected to the set of switches in the range adaptable power divider layer for deactivation.

20 Claims, 18 Drawing Sheets

(56) References Cited

U.S. PATENT DOCUMENTS

2011/0194551 A1    8/2011  Lee et al.
2018/0241255 A1*  8/2018  Leabman ............. H04B 5/0037

OTHER PUBLICATIONS

S. J. Franson et al., "Gigabit per Second Data Transfer in High-Gain Metamaterial Structures at 60 GHz," in IEEE Transactions on Antennas and Propagation, vol. 57, No. 10, pp. 2913-2925, Oct. 2009.

* cited by examiner

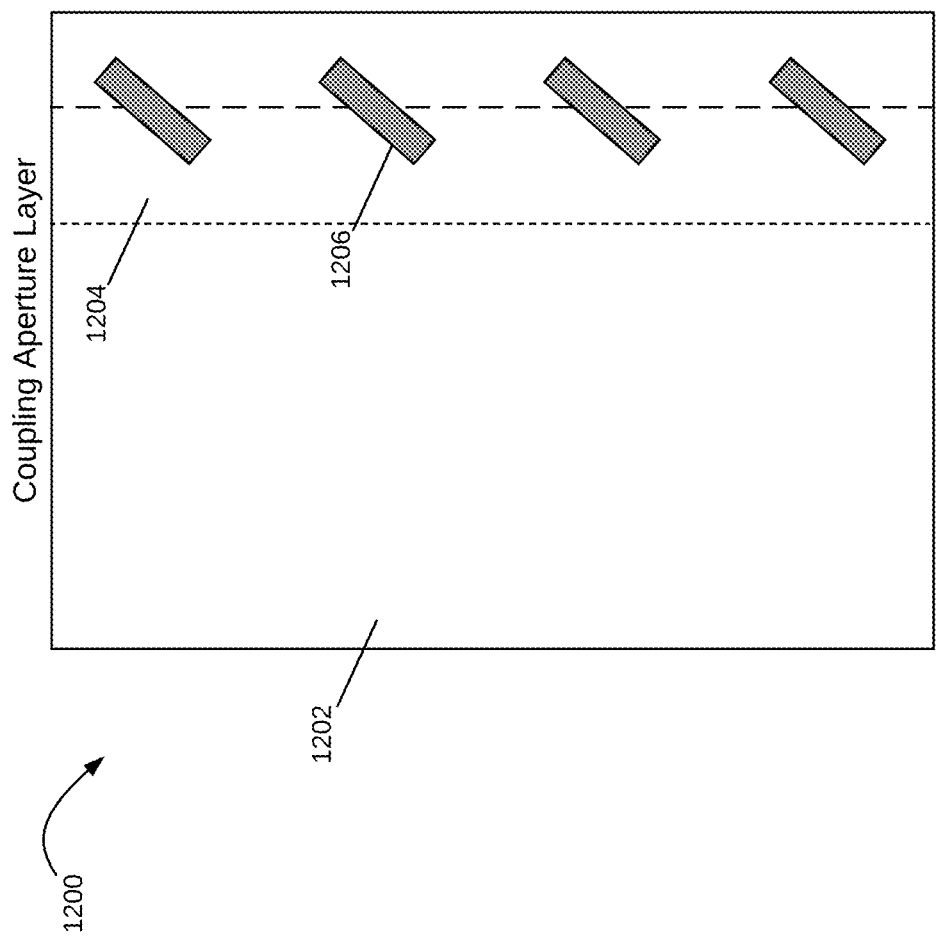

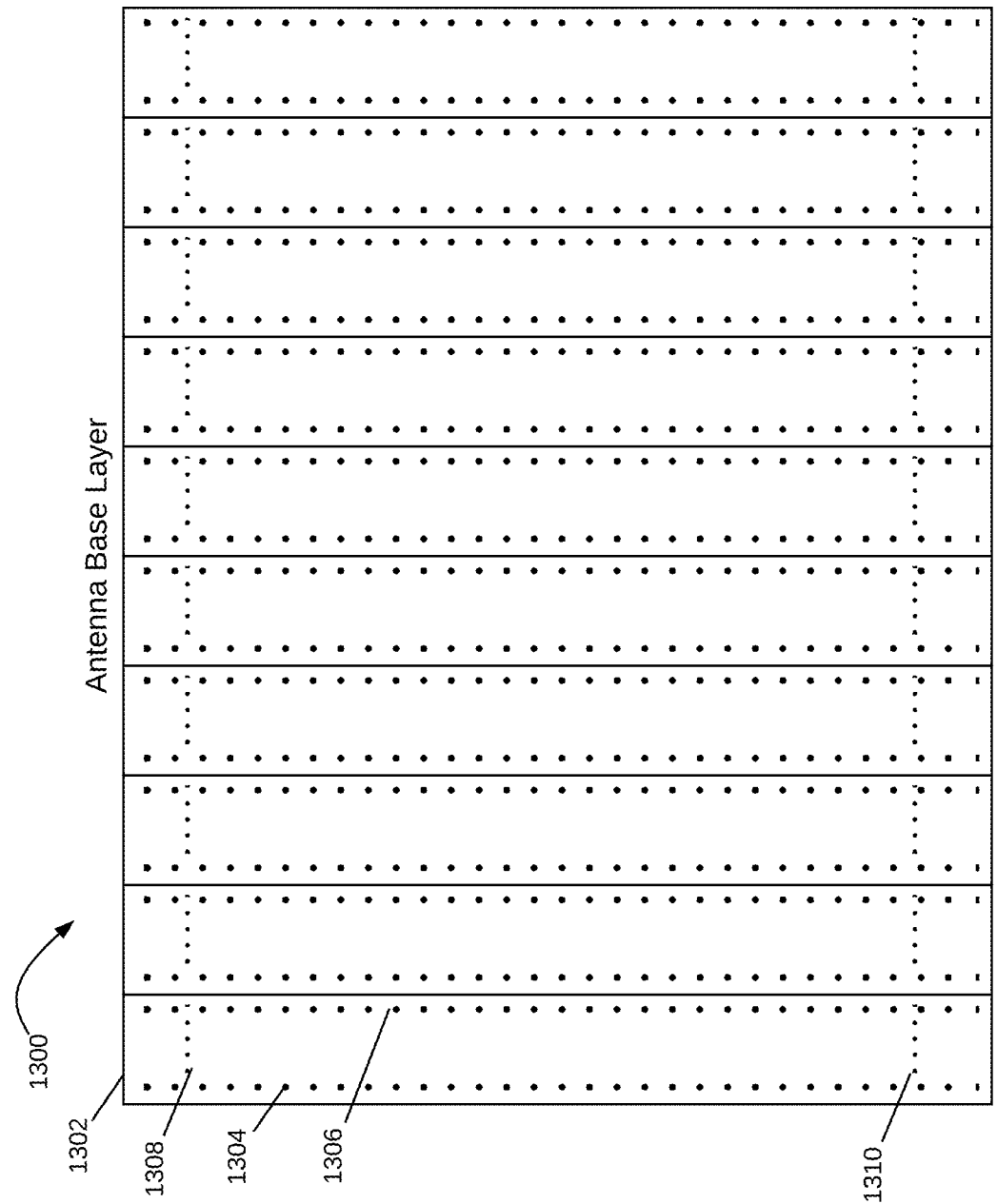

RANGE ADAPTABLE ANTENNA SYSTEM FOR AUTONOMOUS VEHICLES

CROSS-REFERENCE TO RELATED APPLICATIONS

This application claims priority from U.S. Provisional Application No. 62/752,258, entitled "Range Adaptable Antenna System for Autonomous Vehicles," filed on Oct. 29, 2018, and incorporated herein by reference in its entirety.

BACKGROUND

Autonomous driving is quickly moving from the realm of science fiction to becoming an achievable reality. Already in the market are Advanced-Driver Assistance Systems ("ADAS") that automate, adapt and enhance vehicles for safety and better driving. The next step will be vehicles that increasingly assume control of driving functions such as steering, accelerating, braking and monitoring the surrounding environment and driving conditions to respond to events, such as changing lanes or speed when needed to avoid traffic, crossing pedestrians, animals, and so on.

An aspect of making this work is the ability to detect and classify targets in the surrounding environment at the same as or possibly even better level than humans. Humans are adept at recognizing and perceiving the world around them with an extremely complex human visual system that essentially has two main functional parts: the eye and the brain. In autonomous driving technologies, the eye may include a combination of multiple sensors, such as camera, radar, and lidar, while the brain may involve multiple artificial intelligence, machine learning and deep learning systems. The goal is to have full understanding of a dynamic, fast-moving environment in real time and human-like intelligence to act in response to changes in the environment.

BRIEF DESCRIPTION OF THE DRAWINGS

The present application may be more fully appreciated in connection with the following detailed description taken in conjunction with the accompanying drawings, which may not be drawn to scale and in which like reference characters refer to like parts throughout, and wherein:

FIGS. 12A-B illustrate example coupling layers for use in an antenna layer as in FIG. 8;

FIG. 13 illustrates an antenna base layer for use in an antenna layer as in FIG. 8;

DETAILED DESCRIPTION

A range adaptable antenna system for autonomous vehicles is disclosed. The range adaptable antenna system is suitable for many different millimeter wave ("mm-wave") applications and can be deployed in a variety of different environments and configurations. Mm-wave applications are those operating with frequencies between 30 and 300 GHz or a portion thereof, including autonomous driving applications in the 77 GHz range and 5G applications in the 60 GHz range, among others. In various examples, the range adaptable antenna system is incorporated in a radar in an autonomous driving vehicle to detect and identify targets in the vehicle's path and surrounding environment according to range. Short range targets, i.e., targets at a relatively short distance (<100 m) relative to the antenna's position, receive wider RF beams than long range targets 100 m) to improve target classification across ranges. The targets may include structural elements in the environment such as roads, walls, buildings, road center medians and other objects, as well as vehicles, pedestrians, bystanders, cyclists, plants, trees, animals and so on. The range adaptable antenna array enables a radar to be a "digital eye" with true 3D vision and human-like interpretation of the world.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Figure 1:
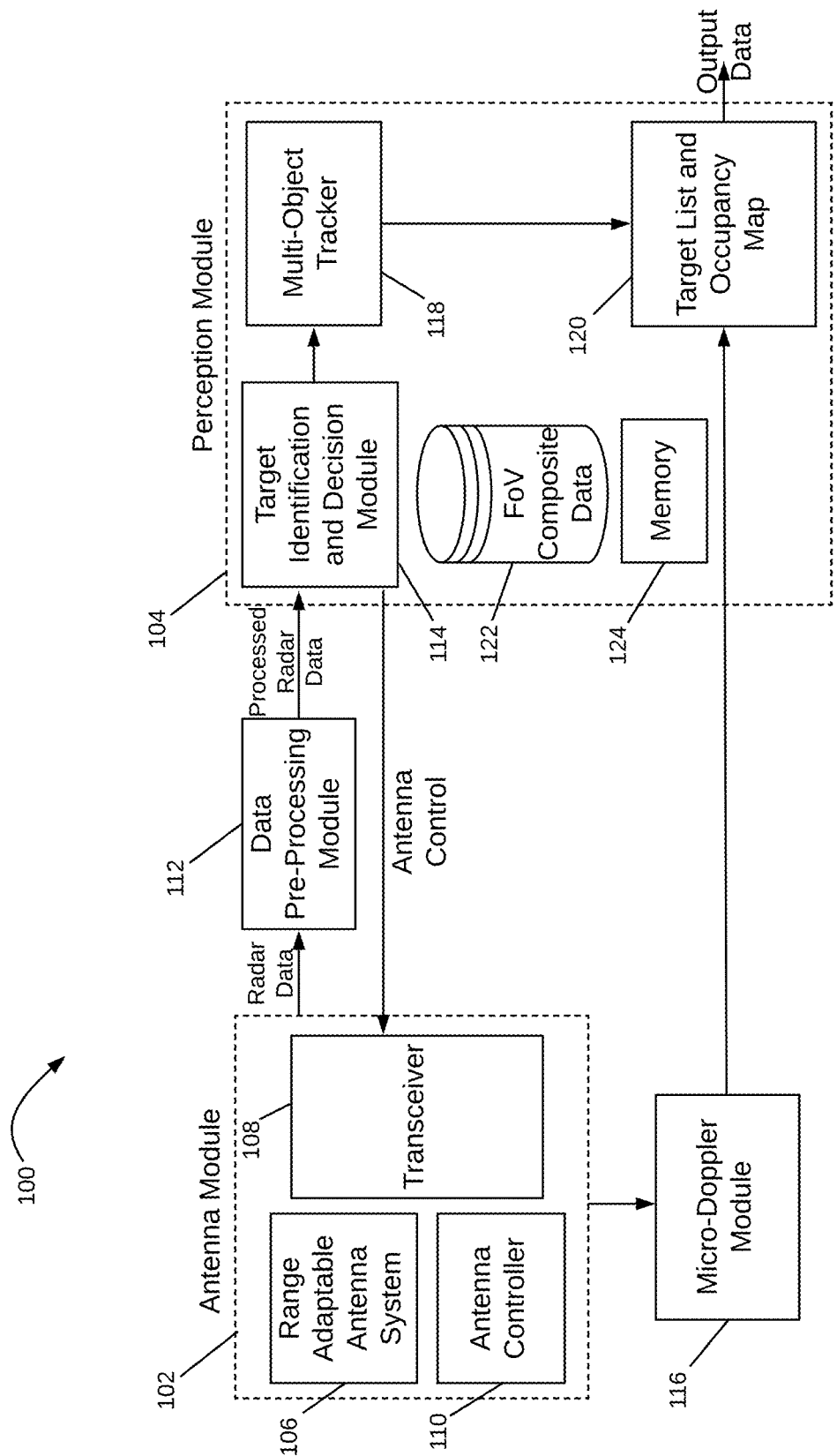
FIG. 1 illustrates a schematic diagram of a radar system for use in an autonomous driving system in accordance with various examples.

FIG. 1 illustrates a schematic diagram of a radar system for use in an autonomous driving system in accordance with various examples. Radar system 100 is a "digital eye" with true 3D vision and capable of a human-like interpretation of the world. The "digital eye" and human-like interpretation capabilities are provided by two main modules: Antenna Module 102 and Perception Module 104.

Antenna module 102 has a range adaptable antenna system 106 to radiate dynamically controllable and highly-directive RF beams. A transceiver module 108 coupled to the range adaptable antenna system 106 prepares a signal for transmission, such as a signal for a radar device, wherein the signal is defined by modulation and frequency. The signal is provided to the range adaptable antenna system 106 through a coaxial cable or other connector and propagates through the antenna structure for transmission through the air via RF beams at a given phase, direction, and so on. The RF beams and their parameters (e.g., beam width, phase, azimuth and elevation angles, etc.) are controlled by antenna controller 110, such as at the direction of perception module 104.

The RF beams reflect off of targets in the vehicle's path and surrounding environment and the RF reflections are received by the transceiver module 108. Radar data from the received RF beams is provided to the perception module 104 for target detection and identification. A data pre-processing module 112 processes the radar data to encode it for the perception module 104. In various examples, the data pre-processing module 112 could be a part of the antenna module 106 or the perception module 104, such as on the same circuit board as the other modules within the antenna or perception modules 102-104. The data pre-pre-processing module 112 may process the radar data through an autoencoder, a non-line-of-sight network, a super-resolution network, or a combination of networks for improving the training and performance of the perception module 104.

The radar data may be organized in sets of Range-Doppler ("RD") map information, corresponding to 4D information that is determined by each RF beam radiated off of targets, such as azimuthal angles, elevation angles, range, and velocity. The RD maps may be extracted from Frequency-Modulated Continuous Wave ("FMCW") radar pulses and contain both noise and systematic artifacts from Fourier analysis of the pulses. The perception module 104 controls further operation of the antenna module 102 by, for example, providing beam parameters for the next RF beams to be radiated from the range adaptable antenna system 106.

In operation, the antenna controller 110 is responsible for directing the range adaptable antenna system 106 to generate RF beams with determined parameters such as beam width, transmit angle, and so on. The antenna controller 110 may, for example, determine the parameters at the direction of the perception module 104, which may at any given time want to focus on a specific area of an FoV upon identifying targets of interest in the vehicle's path or surrounding environment. The antenna controller 110 determines the direction, power, and other parameters of the beams and controls the range adaptable antenna system 106 to achieve beam steering in various directions. The antenna controller 110 also determines a voltage matrix to apply to reactance control mechanisms coupled to the range adaptable antenna system 106 to achieve a given phase shift. Perception module 104 provides control actions to the antenna controller 110 at the direction of the Target Identification and Decision Module 114.

Next, the range adaptable antenna system 106 radiates RF beams having the determined parameters. The RF beams are reflected off of targets in and around the vehicle's path (e.g., in a 360° field of view) and are received by the transceiver module 108 in antenna module 102. The antenna module 102 transmits the received 4D radar data to the data pre-processing module 112 for encoding radar data that is then sent to the perception module 104. A micro-doppler module 116 coupled to the antenna module 102 and the perception module 104 extracts micro-doppler signals from the 4D radar data to aid in the identification of targets by the perception module 104. The micro-doppler module 116 takes a series of RD maps from the antenna module 102 and extracts a micro-doppler signal from them. The micro-doppler signal enables a more accurate identification of targets as it provides information on the occupancy of a target in various directions. Non-rigid targets such as pedestrians and cyclists are known to exhibit a time-varying doppler signature due to swinging arms, legs, etc. By analyzing the frequency of the returned radar signal over time, it is possible to determine the class of the target (i.e., whether a vehicle, pedestrian, cyclist, animal, etc.) with over 90% accuracy. Further, as this classification may be performed by a linear Support Vector Machine ("SVM"), it is extremely computationally efficient. In various examples, the micro-doppler module 116 could be a part of the antenna module 102 or the perception module 104, such as on the same circuit board as the other modules within the range adaptable antenna system 106 or modules 102-04.

The target identification and decision module 114 receives the encoded radar data from the data pre-processing module 112, processes the encoded data to detect and identify targets, and determines the control actions to be performed by the antenna module 102 based on the detection and identification of such targets. For example, the target identification and decision module 114 may detect a cyclist on the path of the vehicle and direct the antenna module 102, at the instruction of its antenna controller 110, to focus additional RF beams at a given phase shift and direction within the portion of the FoV corresponding to the cyclist's location.

The perception module 104 may also include a multi-object tracker 118 to track the identified targets over time, such as, for example, with the use of a Kalman filter. The multi-object tracker 118 matches candidate targets identified by the target identification and decision module 114 with targets it has detected in previous time windows. By combining information from previous measurements, expected measurement uncertainties, and some physical knowledge, the multi-object tracker 118 generates robust, accurate estimates of target locations. Information on identified targets over time are then stored at a Target List and Occupancy Map 120, which keeps tracks of targets' locations and their movement over time as determined by the multi-object tracker 118. The tracking information provided by the multi-object tracker 118 and the micro-doppler signal provided by the micro-doppler module 116 are combined to produce an output containing the type/class of target identified, their location, their velocity, and so on. This information from the radar system 100 is then sent to a sensor fusion module in the vehicle, where it is processed together with information from other sensors in the vehicle.

In various examples, an FoV composite data unit 122 stores information that describes an FoV. This may be historical data used to track trends and anticipate behaviors and traffic conditions or may be instantaneous or real-time data that describes the FoV at a moment in time or over a window in time. The ability to store this data enables the perception module 104 to make decisions that are strategically targeted at a particular point or area within the FoV. For example, the FoV may be clear (no echoes received) for five minutes, and then one echo arrives from a specific region in the FoV; this is similar to detecting the front of a car. In response, the perception module 104 may determine to narrow the beam width for a more focused view of that sector or area in the FoV. The next scan may indicate the targets' length or other dimension, and if the target is a car, the perception module 104 may consider what direction the target is moving and focus the beams on that area. The perception module 104 may also instruct the range adaptable antenna system 106 to produce wider RF beams if it finds targets at close range, e.g., <100 m away. Similarly, the echo may be from a spurious target, such as a bird, which is small and moving quickly out of the path of the car. In this case, the perception module 104 may instruct the range adaptable antenna system 106 to generate narrower RF beams to improve the identification of the target at farther ranges. There are a variety of other uses for the FoV composite data 122, including the ability to identify a specific type of target based on previous detection. A memory 124 stores useful data for the radar system 100, such as, for example, information on which subarrays of the range adaptable antenna 106 perform better under different conditions.

In various examples described herein, the use of radar system 100 in an autonomous driving vehicle provides a reliable way to detect targets in difficult weather conditions. For example, historically a driver will slow down dramatically in thick fog, as the driving speed decreases with decreases in visibility. On a highway in Europe, for example, where the speed limit is 115 km/h, a driver may need to slow down to 40 km/h when visibility is poor. Using the radar system 100, the driver (or driverless vehicle) may maintain the maximum safe speed without regard to the weather conditions. Even if other drivers slow down, a vehicle enabled with the radar system 100 will be able to detect those slow-moving vehicles and obstacles in the way and avoid/navigate around them.

Additionally, in highly congested areas, it is necessary for an autonomous vehicle to detect targets in sufficient time to react and take action. The examples provided herein for a radar system increase the sweep time of a radar signal so as to detect any echoes in time to react. In rural areas and other areas with few obstacles during travel, the perception module 104 instructs the range adaptable antenna system 106 to adjust the focus of the beam to a larger beam width, thereby enabling a faster scan of areas where there are few echoes. The perception module 104 may detect this situation by evaluating the number of echoes received within a given time period and making beam size adjustments accordingly. Once a target is detected, the perception module 104 determines how to adjust the beam focus. This is achieved by changing the specific configurations and conditions of the range adaptable antenna system 106.

All of these detection scenarios, analysis and reactions may be stored in the perception module 104 and used for later analysis or simplified reactions. For example, if there is an increase in the echoes received at a given time of day or on a specific highway, that information is fed into the antenna controller 110 to assist in proactive preparation and configuration of the range adaptable antenna system 106. Additionally, there may be some subarray combinations that perform better, such as to achieve a desired result, and this is stored in the memory 124.

Figure 2:
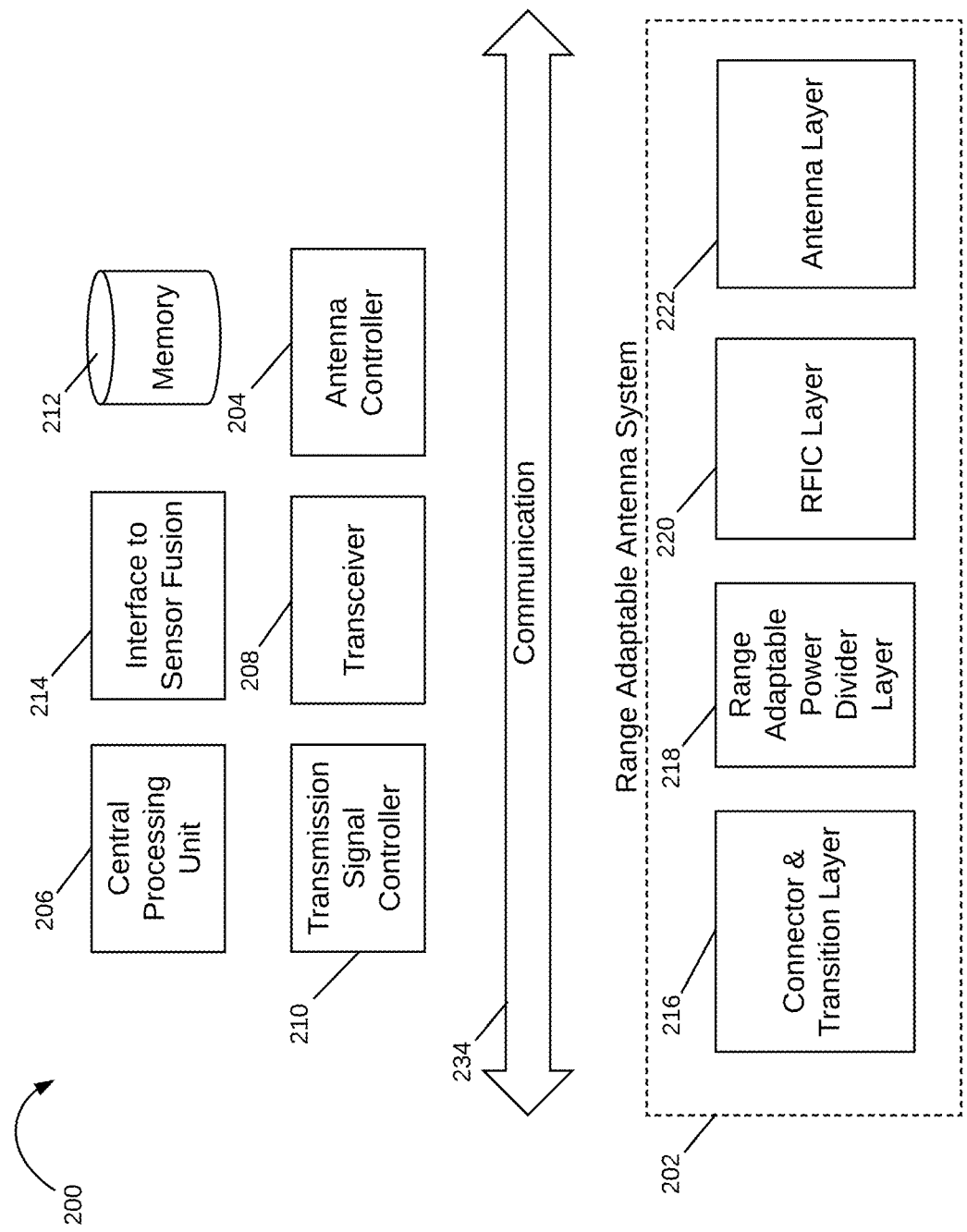
FIG. 2 is a schematic diagram of an antenna module for use with a radar system as in FIG. 1 in accordance with various examples.

Attention is now directed at FIG. 2, which shows a schematic diagram of an antenna module for use with a radar system implemented as in FIG. 1 in accordance with various examples. Range adaptable antenna 200 has a range adaptable antenna system 202 coupled to an antenna controller 204, a central processor 206, and a transceiver 208. A transmission signal controller 210 generates the specific transmission signal, such as an FMCW signal, which is used for radar sensor applications as the transmitted signal is modulated in frequency, or phase. The FMCW signal enables a radar to measure range to a target by measuring the phase differences in phase or frequency between the transmitted signal and the received or reflected signal. Within FMCW formats, there are a variety of modulation patterns that may be used within FMCW, including triangular, sawtooth, rectangular and so forth, each having advantages and purposes. For example, sawtooth modulation may be used for large distances to a target; a triangular modulation enables use of the Doppler frequency, and so forth.

Other modulation types may be incorporated according to the desired information and specifications of a system and application. For example, the transmission signal controller 210 may also generate a cellular modulated signal, such as an Orthogonal Frequency Division Multiplexed ("OFDM") signal. In some examples, the signal is provided to the antenna module 200 and the transmission signal controller 210 may act as an interface, translator or modulation controller, or otherwise as required for the signal to propagate through a transmission line system. The received information is stored in a memory storage unit 212, wherein the information structure may be determined by the type or transmission and modulation pattern.

In various examples, the range adaptable antenna system 202 radiates the signal through a structure consisting of four main layers: (1) connector and transition layer 216; (2) range adaptable power divider layer 218; (3) RFIC layer 220; and (4) antenna layer 222. The connector and transition layer 216 couples the transmission signal from the transmission signal controller 210 to the PCB for transmission to the power divider layer 218. The range adaptable power divider layer 218 is a corporate feed structure having a plurality of transmission lines for transmitting the signal to the antenna layer 222. Some of the transmission lines, e.g., the transmission lines connected to the edges of the antenna layer 222, include switches to deactivate antenna superelements as needed. Antenna superelements on the edges of the antenna layer 222, described in more detail hereinbelow, may be deactivated to widen the beam width of RF beams radiated by the antenna system 202 and improve the detection and classification of targets in shorter ranges.

The antenna layer 222 includes a plurality of radiating slots for radiating the signal into the air. The slots are configured in a specific pattern in superelements, but other patterns, shapes, dimensions, orientations and specifications may be used to achieve a variety of radiation patterns. A superelement has a plurality of slots that are equidistant to and on each side of a center line and staggered along the direction thereof. The RFIC layer 220 is implemented as a Monolithic Microwave Integrated Circuit ("MIMIC") and includes phase shifters (e.g., a varactor, a set of varactors, a phase shift network, or a vector modulator architecture) to achieve any desired phase shift from 0° to 360°. The RFIC layer 220 also includes transitions from the power divider layer 218 to the RFIC layer 220 and from the RFIC layer 220 to the antenna layer 222.

Note that as illustrated, there is one range adaptable antenna system 202 in range adaptable antenna 200. However, a range adaptable antenna 200 may have multiple range adaptable antenna systems in any given configuration. A set of range adaptable antennas may be designated as transmit antennas, and another set may be designated as receive antennas. Further, a range adaptable antenna may be orthogonal from another. Different range adaptable antennas may also have different polarizations. In various examples, different range adaptable antennas may be configured to detect different targets, e.g., a set of antennas may be configured to enhance the detection and identification of pedestrians, another set of antennas may be configured to enhance the detection and identification of vehicles, a set of antennas may be configured to enhance the detection and identification of targets in short range, another set may be configured to enhance the detection and identification of targets in long range, and so forth. In the case of pedestrians, the configuration of the antennas may include power amplifiers to adjust the power of a transmitted signal and/or different polarization modes for different arrays to enhance pedestrian detection. It is appreciated that numerous configurations of range adaptable antennas may be implemented in a given antenna module.

In operation, the antenna controller 204 receives information from other modules in the antenna module 200 and/or from the perception module 104 in FIG. 1 indicating a next radiation beam, wherein a radiation beam may be specified by parameters such as beam width, transmit angle, transmit direction and so forth. The antenna controller 204 determines a voltage matrix to apply to reactance control mechanisms in the range adaptable antenna array 202 to achieve a given phase shift or other parameters. Transceiver 208 prepares a signal for transmission, such as a signal for a radar device, wherein the signal is defined by modulation and frequency. The signal is received by the range adaptable antenna system 202 and the desired phase of the radiated signal is adjusted at the direction of the antenna controller 204. In some examples, range adaptable antenna array 202 can be implemented in many applications, including radar, cellular antennas, and autonomous vehicles to detect and identify targets in the path of or surrounding the vehicle. Alternate examples may use the range adaptable antenna for wireless communications, medical equipment, sensing, monitoring, and so forth. Each application type incorporates designs and configurations of the elements, structures and modules described herein to accommodate their needs and goals.

In antenna module 200, a signal is specified by antenna controller 204, which may be at the direction of perception module (e.g., perception module 104 in FIG. 1), a sensor fusion module via interface to sensor fusion 214, or it may be based on program information from memory storage 212. There are a variety of considerations to determine the beam formation, wherein this information is provided to antenna controller 204 to configure the various elements of the range adaptable antenna system 202, which are described herein below. The transmission signal controller 210 generates the transmission signal and provides it to the range adaptable antenna system 202, such as through a coaxial cable or other connector. The signal propagates through the connector and transition layer 216 to the antenna layer 222 for transmission through the air.

The antenna layer 222 may be referred to as a type of slotted waveguide antenna ("SWA"), wherein the power divider layer 216 acts as a feed to the antenna layer 222. Alternate examples may reconfigure and/or modify the antenna structure to improve radiation patterns, bandwidth, side lobe levels, and so forth. The antenna performance may be adjusted by design of the antenna's features and materials, such the shape of the slots, slot patterns, slot dimensions, conductive trace materials and patterns, as well as other modifications to achieve impedance matching and so forth.

Figure 3:
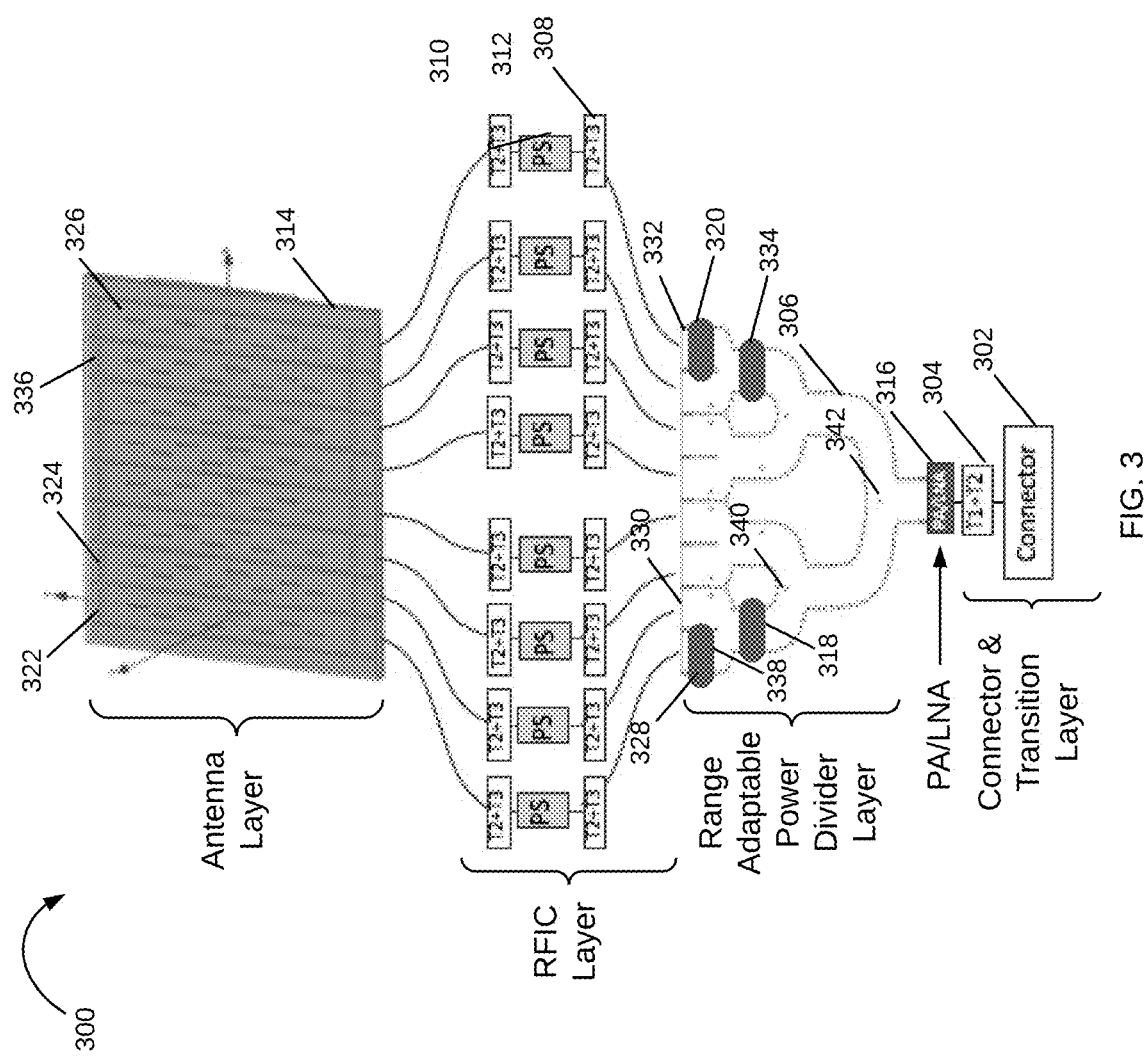
FIG. 3 is a schematic diagram of an antenna system for use with an antenna module as in FIG. 2 in accordance with various examples.

Attention is now directed to FIG. 3, which is a schematic diagram of an antenna system for use with the antenna module of FIG. 2 in accordance with various examples. In the example of FIG. 3, the antenna system 300 has a connector 302 and transition 304 in a connector and transition layer, a range adaptable power divider layer 306, an RFIC layer with transitions 308-310 and phase shifters 312, and an antenna layer 314. Antenna system 300 also has a Power Amplifier ("PA") and a Low Noise Amplifier ("LNA") module 316 to boost the transmission signal coming from the connector 302 before it is split through the power divider layer 306.

The range adaptable power divider layer 306 is a type of a power divider circuit such that it takes an input signal and divides it through a network of paths or transmission lines. Each path may have similar dimensions; however, the size of the paths may be configured to achieve a desired transmission and/or radiation result. The range adaptable power divider layer 306 is designed to be impedance-matched, such that the impedances at each end of a transmission line matches the characteristic impedance of the line. Each transmission line is bounded by a set of vias.

In various examples, the range adaptable power divider layer 306 includes switches to deactivate superelements in the antenna layer 314. Deactivation of superelements occurs by turning off the switches that are coupled to them. When a switch is on, its corresponding superelement(s) is active; when the switch is off, its corresponding superelement(s) is inactive and does not radiate a signal. For example, switch 318 may be used to deactivate superelements 322 and 324, while switch 320 may be used to deactivate superelement 326. Each switch deactivates as many superelements as the transmission lines it is connected to. Switch 318 is connected to two transmission lines, 328 and 330, and therefore is able to deactivate two superelements, 322 and 324. Switch 320 is connected to a single transmission line 332 and therefore is able to deactivate a single superelement, i.e., superelement 326. Note that switches for deactivation of superelements include symmetric pairs with respect to the center of the antenna layer 314. Switch 318 is symmetric to switch 322, which can deactivate superelements 326 and 328. Switch 320 is symmetric to switch 338, which can deactivate superelement 322.

Deactivation of superelements on the edges of the antenna layer results in wider beam widths for the radiated RF beams. The wider beam widths improve the detection and classification of targets in short ranges, e.g., <100 m. Switches 318, 320, 334 and 338 may be controlled by a perception module, e.g., perception module 104 of FIG. 1, to focus RF beams on targets in ranges closer to the antenna. Note that there can be as many switches as desired in different transmission lines to impose additional control over the generated RF beams. In practice, the number and placement of switches is a design decision made in accordance with the detection and classification goals of the antenna system 300.

In various examples, amplitude tapering can also be provided in the range adaptable power divider layer 306 with a set of matching vias, such as matching vias 340-342, together with switches 318, 320, 334 and 338. By turning the switches on/off and deactivating superelements accordingly, the amplitude distribution can be tapered and the side lobes lowered. For example, side lobes of a Chebyshev distribution at 40 dB can be adjusted to 14 dB. Note that active components may also be added to the range adaptable power divider layer 306 or elsewhere to further taper the amplitude distribution as desired.

Figure 4:
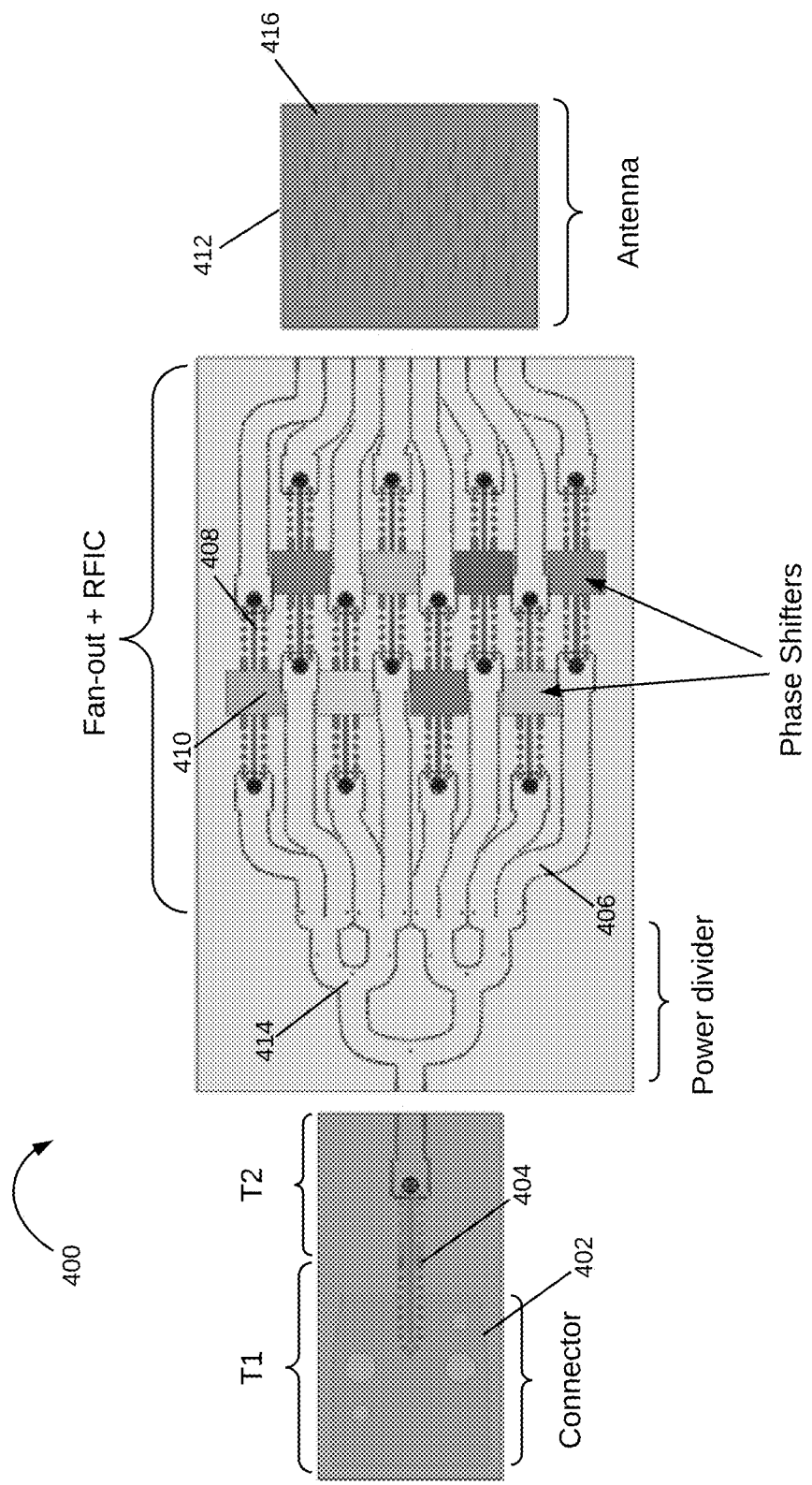
FIG. 4 illustrates a top view of an antenna system as in FIG. 3 in accordance with various examples.

Attention is now directed to FIG. 4, which illustrates a top view of the antenna system of FIG. 3 in accordance with various examples. Antenna system 400 is shown with its 4 layers: (1) a connector and transition layer with connector 402 and transitions 404; (2) a range adaptable power divider layer with power divider 406; (3) an RFIC layer with transitions 408 and phase shifters 410; and (4) an antenna layer with antenna 412. Note that the 4 layers are implemented in such a way as to minimize loss and maximize the use of space. In various examples, the 4 layers are implemented in a single board; in other examples, different boards may be used.

Note also that the power divider 406 may include a number of switches to deactivate superelements if needed to improve the detection and classification of targets in short ranges. In this example, antenna 412 is an 8×8 antenna array having 8 superelements with 8 radiating slots in each superelement, e.g., superelement 416. A superelement, as generally described herein, is formed by set of radiating slots and a transmission line in an antenna base layer as described in more detail below with reference to FIGS. 8-11. Each superelement in the array may be designed to provide RF signals at a specific phase, with phase shifters 410 able to generate any phase shift from 0 to 360° for a complete FoV.

Figure 5:
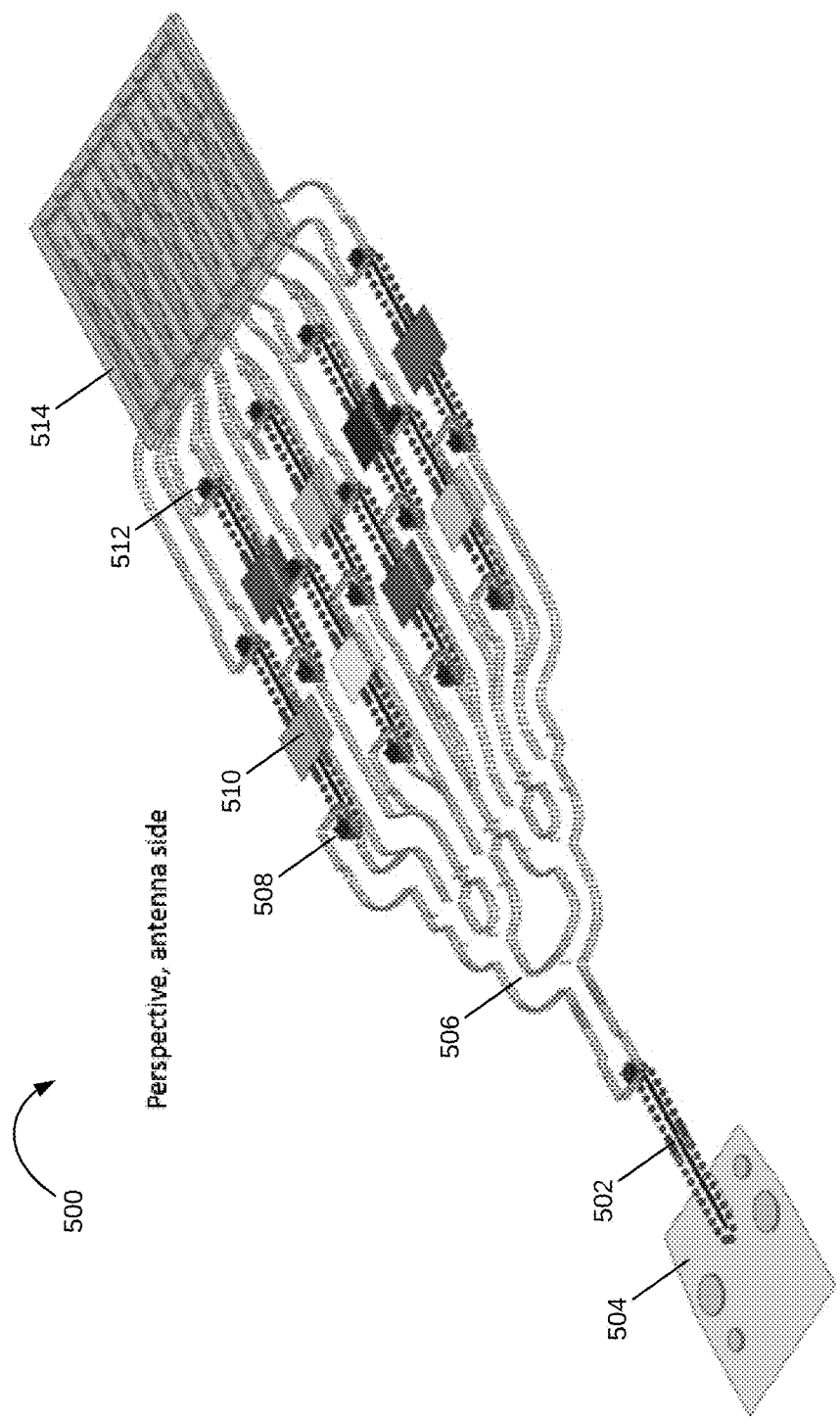
FIG. 5 illustrates a perspective view of an antenna system as in FIG. 3 in accordance with various examples.
Figure 6:
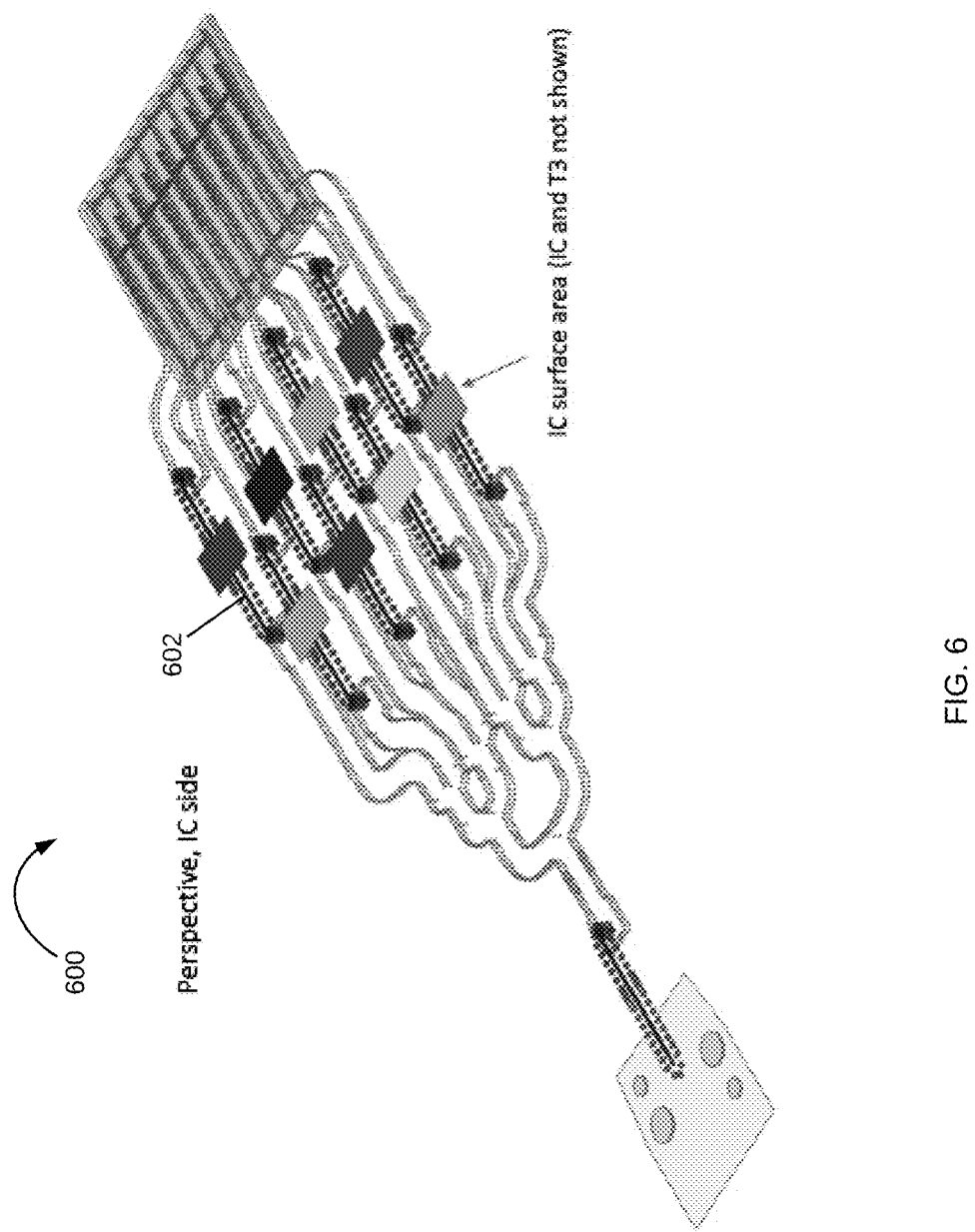
FIG. 6 illustrates another perspective view of an antenna system as in FIG. 3 in accordance with various examples.
Figure 7:
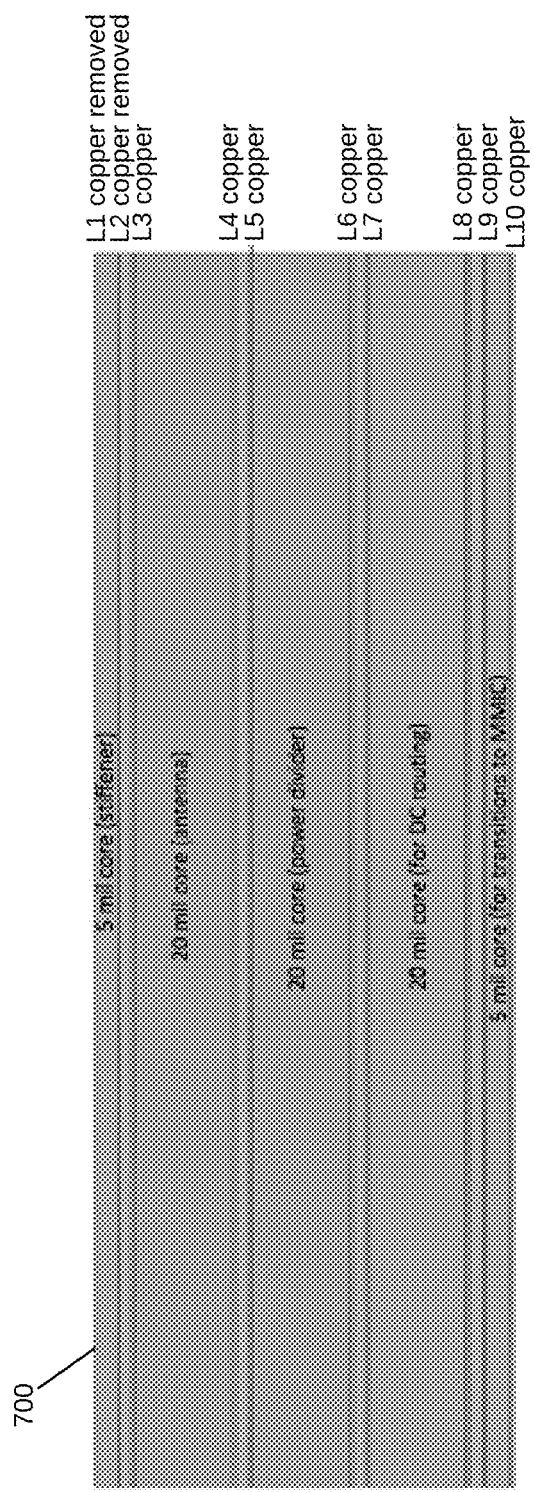
FIG. 7 illustrates a board stack-up configuration for an antenna system implemented as in FIG. 3 in accordance with various examples.
Figure 8:
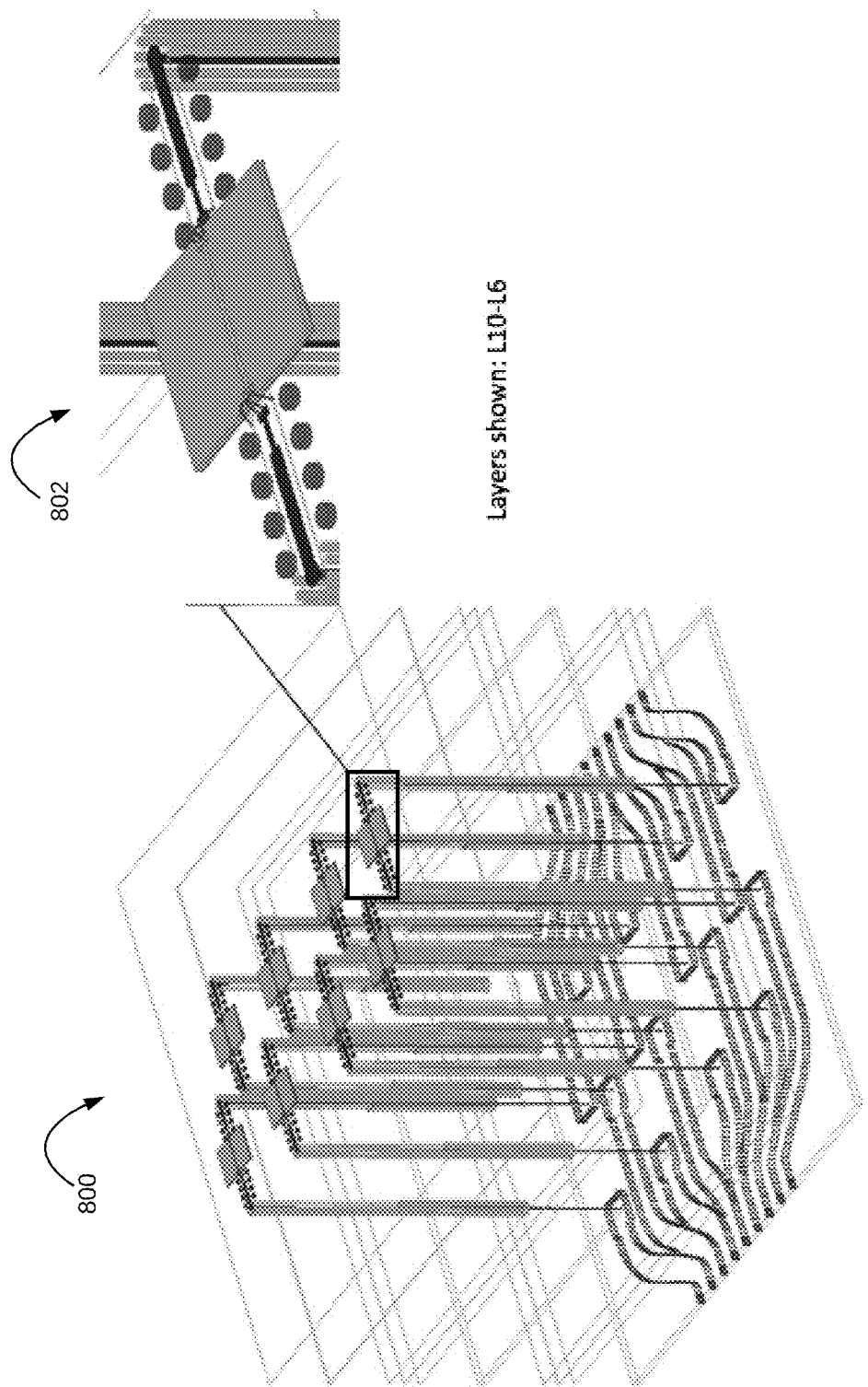
FIG. 8 illustrates a fan-out perspective bottom view of an antenna system implemented as in FIG. 3 in accordance with various examples.
Figure 9:
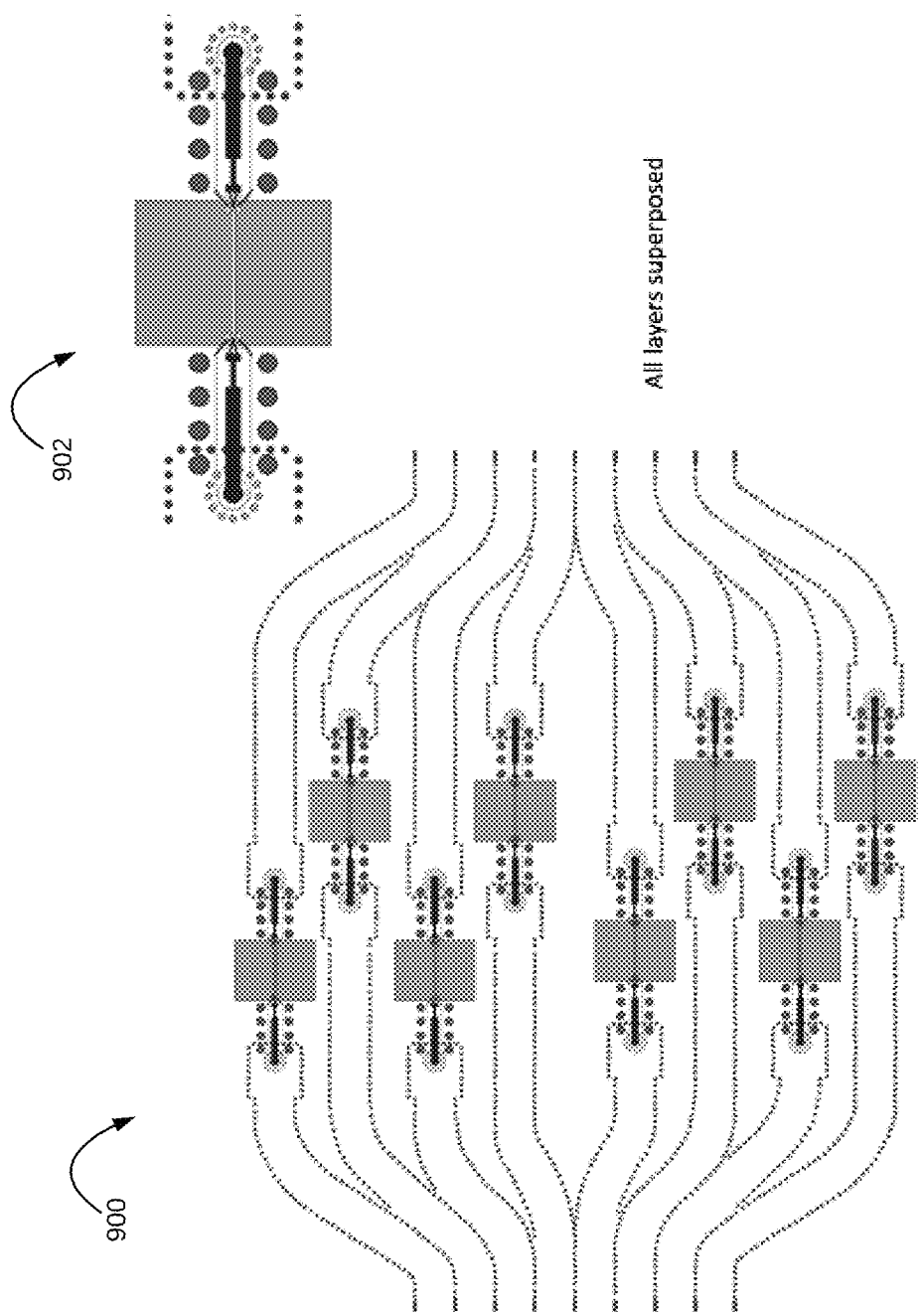
FIG. 9 illustrates a fan-out top view of an antenna system implemented as in FIG. 3 in accordance with various examples.
Figure 10:
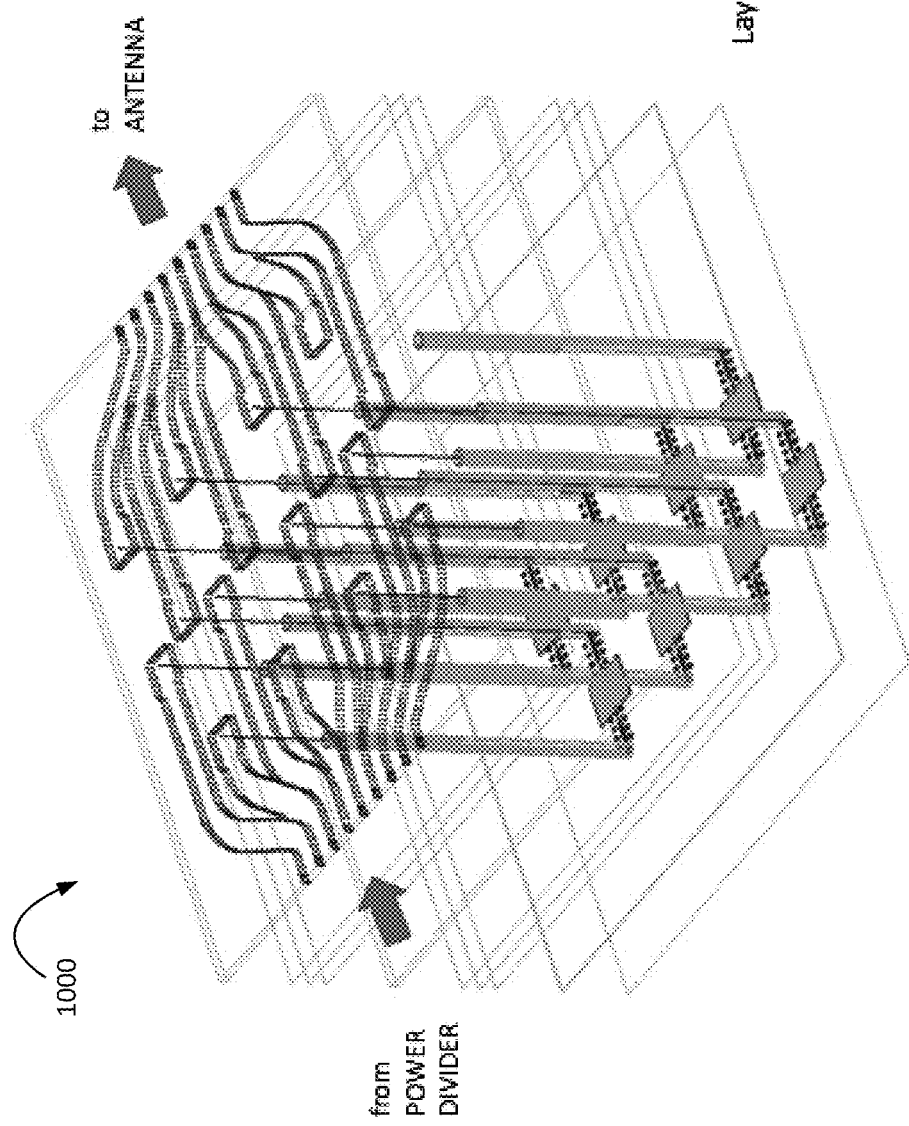
FIG. 10 illustrates a fan-out perspective top view of an antenna system implemented as in FIG. 3 in accordance with various examples.

FIG. 5 illustrates a perspective view of the antenna system of FIG. 3 in accordance with various examples. Antenna system 500 is shown with transitions 502 from connector 504 to power divider 506, transitions 508 from power divider 506 to phase shifters 510, and transitions 512 from phase shifters 510 to antenna 514. Another perspective view is illustrated in FIG. 6 with antenna system 600, highlighting the RFIC layer 602. FIG. 7 illustrates a board stack-up configuration 700 for the antenna system of FIG. 3 in accordance with various examples. In this configuration 700, there are 10 layers, including a 5 mil core for the transitions to the RFIC MMIC layer, a 20 mil core used for DC routing, a 20 mil core for a range adaptable power divider, a 20 mil core for the antenna layer, and a protective 5 mil core stiffener, with 3 mil bond ply layers in between these main layers. A fan-out exploded perspective view of the stack-up is shown in FIG. 8. View 800 is a bottom view of layers 6 through 10, highlighting the phase shifters in the RFIC layer and the transitions between the phase shifters and transmission lines in the power divider layer, as seen in zoomed view 802. Another perspective is provided in FIG. 9, showing view 900 with all layers superposed and zoomed view 902 illustrating a phase shifter and connected transitions. Yet another perspective view of layers 6-10, this time a bottom perspective view 1000, is illustrated in FIG. 10.

Figure 11:
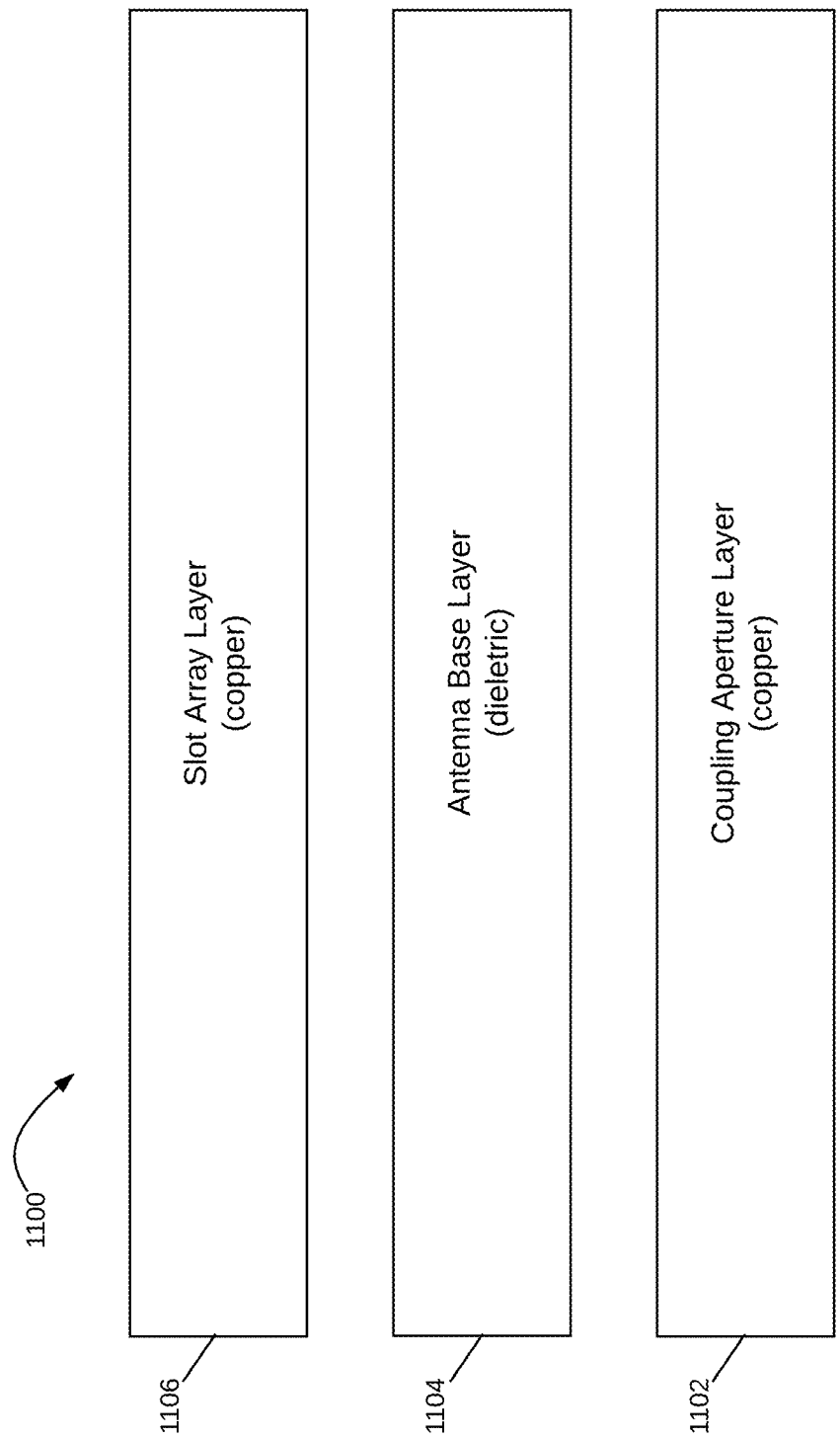
FIG. 11 illustrates an antenna layer for use in an antenna system as in FIG. 2 in accordance with various examples.

Referring now to FIG. 11, an antenna layer for use in a range adaptable antenna system implemented as in FIG. 2 in accordance with various examples is described. Antenna layer 1100 has two conductive layers surrounding a dielectric layer. The two conductive layers are a coupling aperture layer 1102 and a slot array layer 1106. The antenna layer 1104 is a dielectric layer having an array of transmission lines. The array of transmission lines in antenna layer 1104 together with the array of slots in the slot array layer 1106 form an array of superelements. As described above with reference to FIG. 4, each superelement in the array may be designed to provide RF signals at a specific phase shift generated by the phase shifters in the RFIC layer.

Figure 12B:
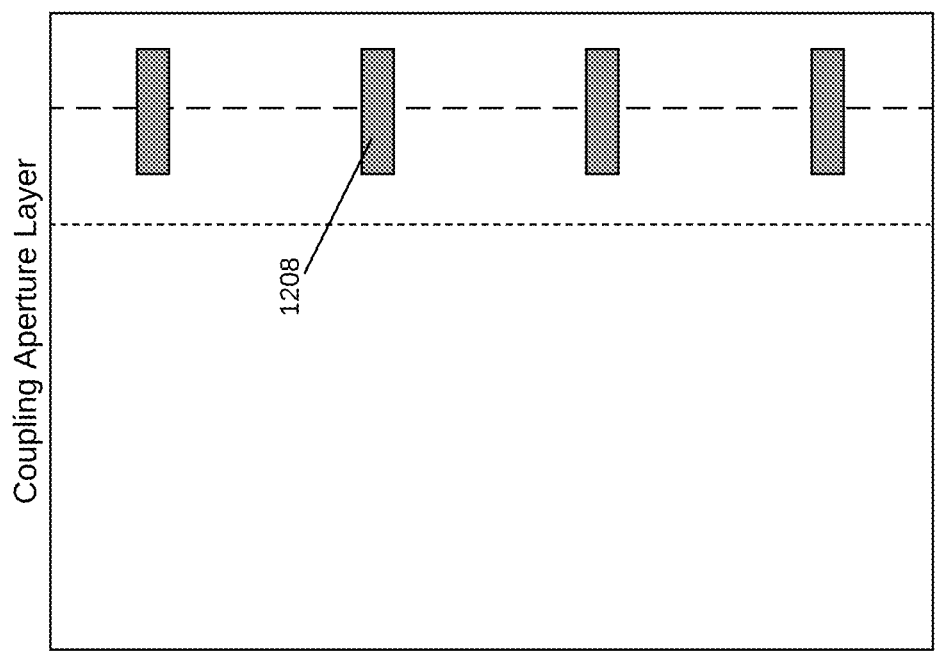

FIGS. 12A-12B illustrate the coupling aperture layer 1102 in more detail. Coupling aperture layer 1200 has a plurality of apertures for coupling the signals from the power divider layer to the superelements in the antenna. Layer 1200 is a conductive layer having two sections: section 1202 and section 1204. Section 1204 includes the coupling apertures oriented at an angle (e.g., 45°) about the centerline, while section 1202 is a contiguous portion of copper material. Each coupling aperture or slot, e.g., coupling slot 1206, provides transmission signals to corresponding radiating slots in the superelements. In FIG. 12B, the coupling slots are at an 90° angle, or perpendicular to the radiating slots in the antenna. Note that the slots can be oriented at other desired angles, depending on the antenna requirements, the desired applications, antenna characteristics, performance, and so on.

FIG. 13 illustrates the antenna base layer in more detail. Antenna base layer 1300 is shown with an array of transmission lines, where each element in the array has a parallel lines of vias and a set of termination vias. For example, element 1302 has parallel vias 1304-1306 and termination vias 1308-1310. There could be any number of elements in antenna layer 1300, depending on the implementation, such as 8, 16, 32 and so on. The number of elements in the antenna base layer 1300, the number of levels in the feed network layer and the number of elements in the slot array layer are designed to be consistent, that is, if the feed network has 5 levels with 32 paths for 32 signals, then the antenna base layer 1000 has 32 elements in its array to feed into 32 slot elements.

Figure 14:
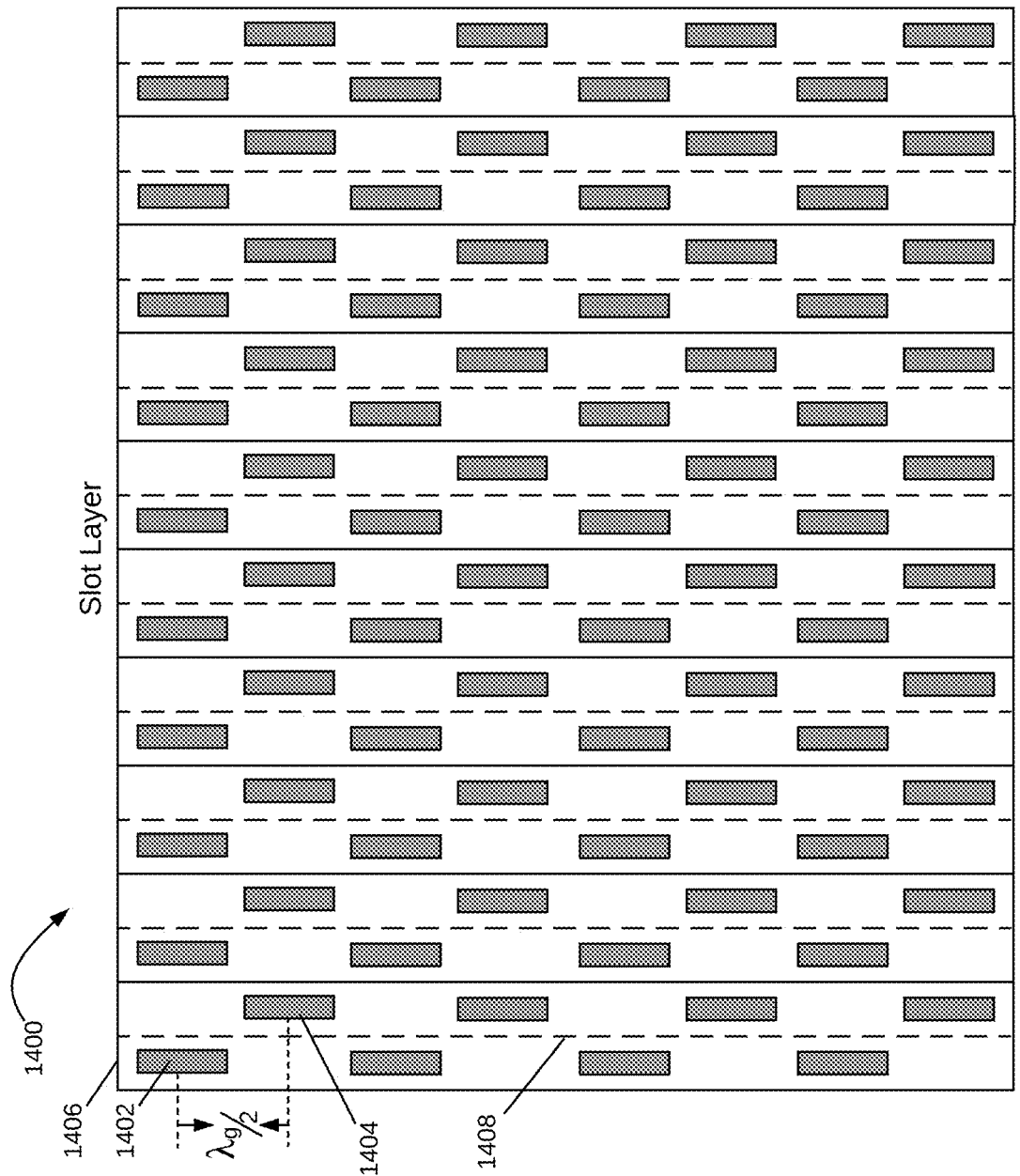
FIG. 14 illustrates a slot layer for use in an antenna layer as in FIG. 8.
Figure 15:
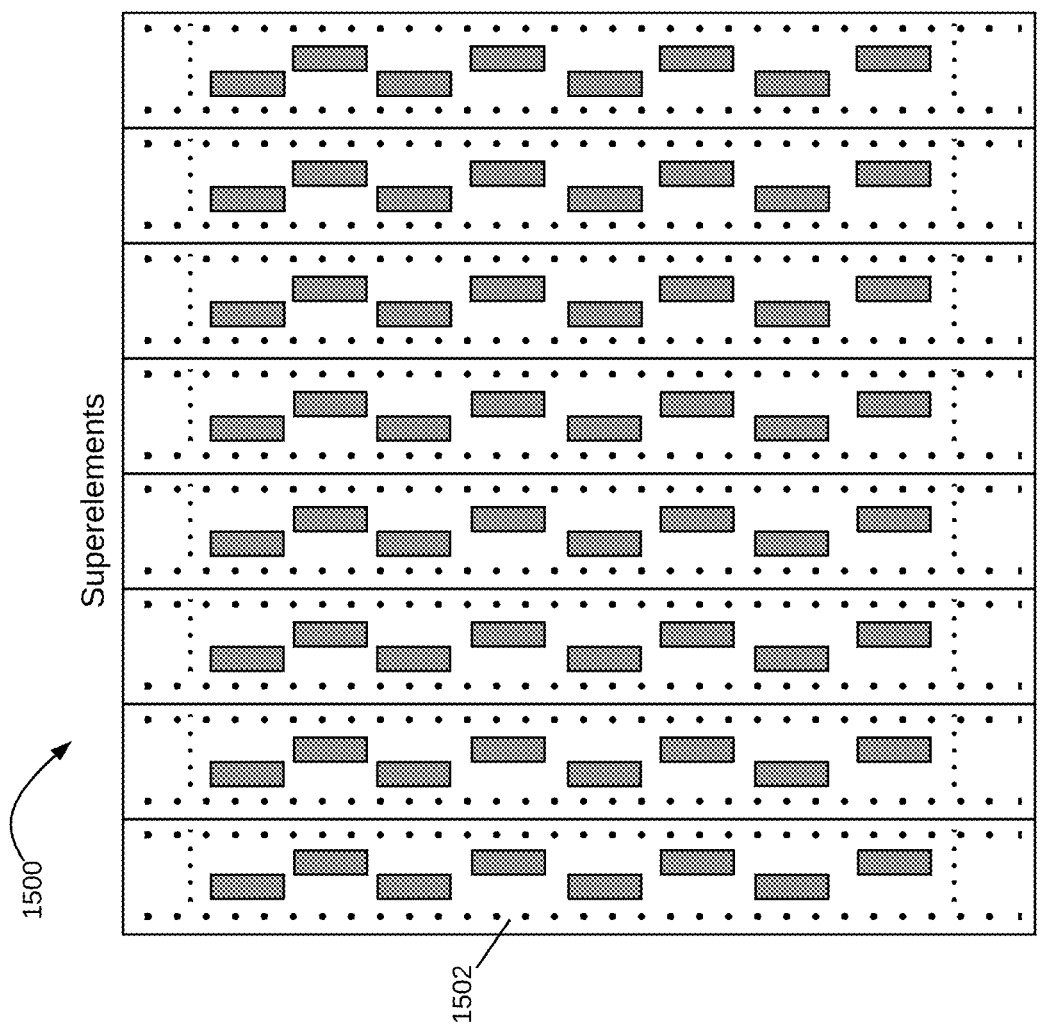
FIG. 15 illustrates an array of superelements in accordance with various examples.

FIG. 14 illustrates the slot array layer in more detail. Slot array layer 1400 is an array of elements, with each element having a plurality of slots or openings along its surface. The slots in each element are equidistant to a center line and staggered along the direction thereof. For example, slots 1402-1404 in element 1406 are equidistant from center line 1408. Each element in slot array layer 1400 together with a corresponding element in antenna layer 1100 form a superelement. The superelements can be thought of as waveguides, bounded by conductive vias along their sides and a ground at their end, as shown in antenna layer 1104 with element 1406. The distance between the center of a slot in an element of a slot array layer 1400 and the center of an adjacent equidistant slot is shown as $\lambda_g/2$, where $\lambda_g$ is the guide wavelength. In one example, the slot array layer 1400 has 32 elements with 8 slots each. The range adaptable antenna in this configuration is therefore a 32×8 antenna array. An array of superelements is shown in FIG. 15, with 8 superelements, e.g., superelement 1502 of 8 slots each forming an 8×8 superelement array 1500.

Figure 16:
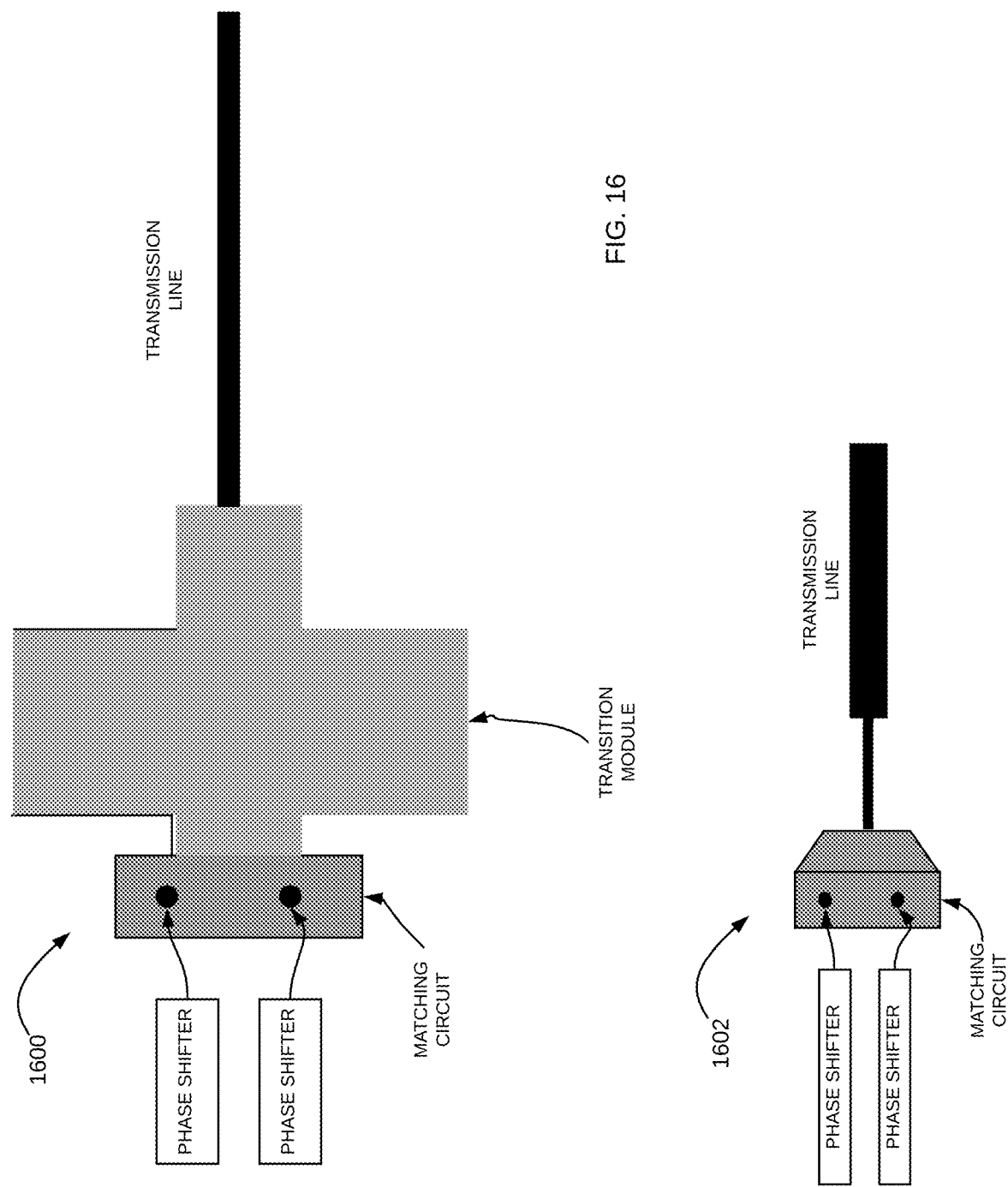
FIG. 16 illustrates a schematic diagram of a transition from an RFIC layer to an antenna layer.
Figure 17:
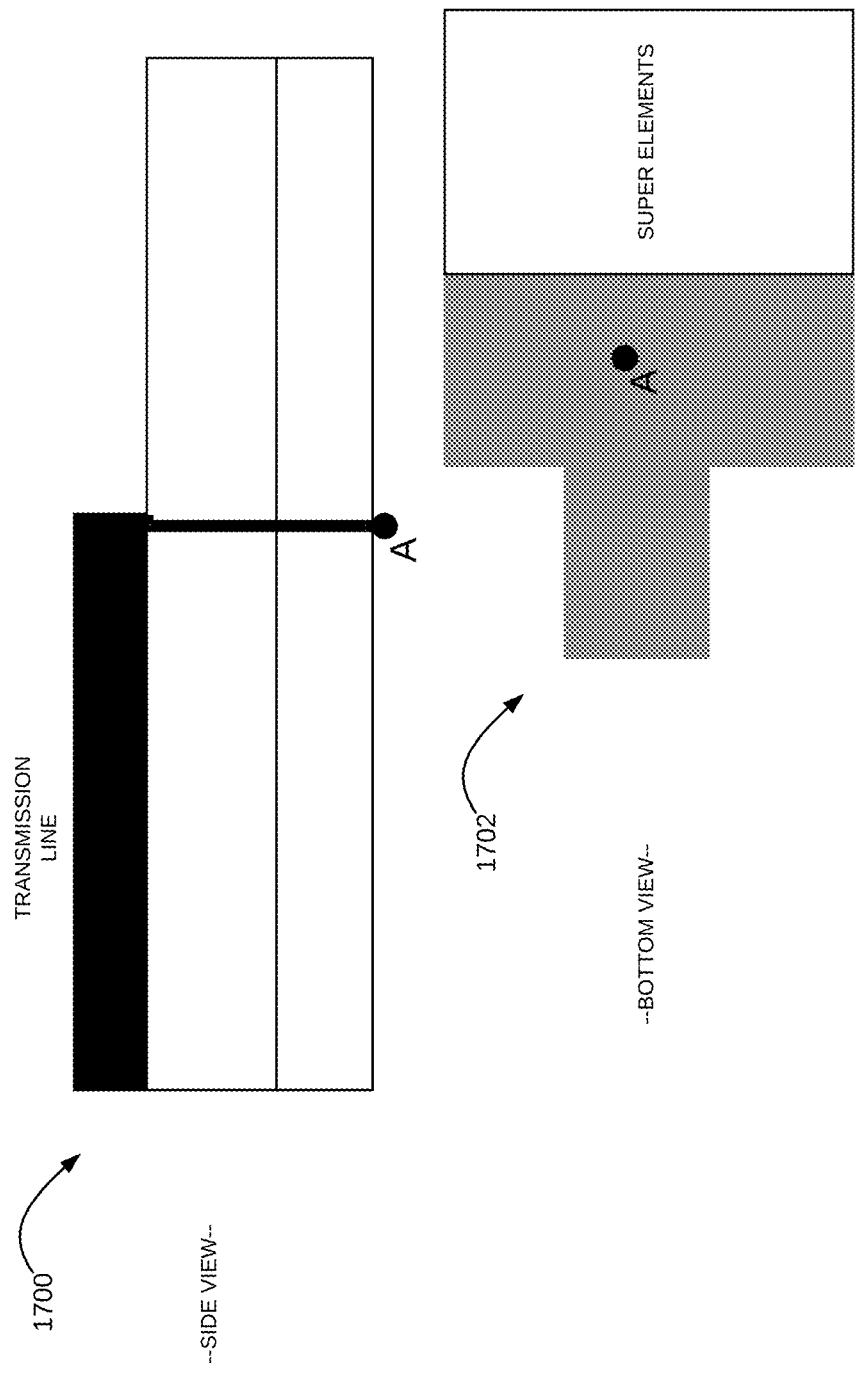
FIG. 17 is another view of a transition from an RFIC layer to an antenna layer in accordance with various examples.

FIGS. 16-17 illustrate schematic diagrams of a transition from an RFIC layer to an antenna layer. Transition 1600 is used to couple the phase shifters from the RFIC layer to the antenna layer. The transition 1600 has a matching circuit as seen in view 1602 and a transition module coupling the matching circuit to a transmission line that leads to the antenna layer. Other views 1700-1702 are shown in FIG. 17.

It is appreciated that the disclosed examples are a dramatic contrast to the traditional complex systems incorporating multiple antennas controlled by digital beam forming. The disclosed examples increase the speed and flexibility of conventional systems, while reducing the footprint and expanding performance.

The radar system 100 of FIG. 1 may implement the various aspects, configurations, processes and modules described throughout this description. The radar system 100 is configured for placement in an autonomous driving system or in another structure in an environment (e.g., buildings, bill boards along roads, road signs, traffic lights, etc.) to complement and supplement information of individual vehicles, devices and so forth. The radar system scans the environment, and may incorporate infrastructure information and data, to alert drivers and vehicles as to conditions in their path or surrounding environment. The radar system is also able to identify targets and actions within the environment. The various examples described herein support autonomous driving with improved sensor performance, all-weather/all-condition detection, advanced decision-making algorithms and interaction with other sensors through sensor fusion. The radar system leverages intelligent metamaterial antenna structures and AI techniques to create a truly intelligent digital eye for autonomous vehicles.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A range adaptable antenna system for use in autonomous vehicles, comprising:
   a connector and a transition layer to receive an RF transmission signal from a transmission signal controller;
   a range adaptable power divider layer coupled to the connector and transition layer to divide the RF transmission signal into a plurality of transmission signals to propagate through an array of transmission lines, wherein a set of transmission lines from the array of transmission lines comprises a set of switches;
   an RFIC layer having a plurality of phase shifters to apply different phase shifts to the plurality of transmission signals and generate a plurality of phase shifted transmission signals; and
   an antenna layer having an array of superelements for radiating the plurality of phase shifted transmission signals, wherein a set of superelements is connected to the set of switches in the range adaptable power divider layer for deactivation.

2. The range adaptable antenna system of claim 1, wherein the connector and transition layer couples the RF transmission signal from the transmission signal controller to a printed circuit board with a connector for transmission to the range adaptable power divider layer.

3. The range adaptable antenna system of claim 1, wherein the range adaptable power divider layer comprises a corporate feed structure to divide the RF transmission signal into the plurality of transmission signals.

4. The range adaptable antenna system of claim 1, further comprising a power amplifier and a low noise amplifier module to amplify the RF transmission signal before it is divided into a plurality of transmission signals by the range adaptable power divider layer.

5. The range adaptable antenna system of claim 1, wherein the set of switches comprises pairs of switches that are symmetric with respect to a center of the antenna layer.

6. The range adaptable antenna system of claim 1, wherein a switch from the set of switches deactivates a superelement when the switch is off.

7. The range adaptable antenna system of claim 1, wherein deactivation of a set of superelements comprises radiating the plurality of phase shifted transmission signals with beam widths that are wider than beam widths generated when the set of superelements remains active.

8. The range adaptable antenna system of claim 1, wherein the set of switches is adjusted to taper an amplitude distribution.

9. The range adaptable antenna system of claim 1, wherein the set of switches is adjusted to lower side lobes.

10. A radar system for use in an autonomous driving vehicle, comprising:
    an antenna module to radiate a transmission signal with a range adaptable antenna in a plurality of directions and generate radar data capturing a surrounding environment, the range adaptable antenna comprising a plurality of superelements, wherein a set of superelements in the plurality of superelements is connected to a set of switches for deactivation; and
    a perception module to detect and identify a target in a surrounding environment of the autonomous driving vehicle from the radar data and to control the antenna module based on the detected target.

11. The radar system of claim 10, wherein the antenna module further comprises a connector and a transition layer to receive the transmission signal from a transmission signal controller.

12. The radar system of claim 11, wherein the antenna module further comprises a range adaptable power divider layer coupled to the connector and transition layer to divide the transmission signal into a plurality of transmission signals to propagate through an array of transmission lines, wherein a set of transmission lines in the array of transmission lines comprises the set of switches.

13. The radar system of claim 12, further comprising an RFIC layer having a plurality of phase shifters to apply different phase shifts to the plurality of transmission signals and generate a plurality of phase shifted transmission signals.

14. The radar system of claim 13, wherein the set of switches comprises pairs of switches that are symmetric with respect to a center of the antenna layer.

15. The radar system of claim 10, wherein a switch from the set of switches deactivates a superelement when the switch is off.

16. The radar system of claim 13, wherein deactivation of a set of superelements comprises radiating the plurality of phase shifted transmission signals with beam widths that are wider than beam widths generated when the set of superelements remains active.

17. The radar system of claim 10, wherein the set of switches is adjusted to taper an amplitude distribution.

18. The radar system of claim 10, wherein the set of switches is adjusted to lower side lobes.

19. A range adaptable antenna module for use in an automotive radar, comprising:
    a range adaptable power divider layer comprising an array of transmission lines to divide the RF transmission signal into a plurality of transmission signals, wherein a set of transmission lines from the array of transmission lines comprises a set of switches; and
    an antenna layer comprising an array of superelements coupled to the array of transmission lines, wherein the set of switches is adjusted to deactivate a set of superelements in the array of superelements.

20. The range adaptable antenna module of claim 19, wherein each superelement in the array of superelements comprises a plurality of radiating slots for radiating the plurality of transmission signals.

* * * * *